United States Patent [19]
Astheimer

[11] 3,735,127
[45] May 22, 1973

[54] INFRARED TWO GAS ANALYZER

[75] Inventor: Robert W. Astheimer, Westport, Conn.

[73] Assignee: Barnes Engineering Company, Stamford, Conn.

[22] Filed: Sept. 15, 1971

[21] Appl. No.: 180,583

[52] U.S. Cl. .......................................... 250/43.5 R
[51] Int. Cl. .............................................. G01n 21/26
[58] Field of Search .......................... 250/43.5 R

[56] References Cited

UNITED STATES PATENTS 2,806,144  9/1957  Berger .......................... 250/43.5 R
3,193,677  7/1965  McHenry ..................... 250/43.5 R Primary Examiner—James W. Lawrence
Assistant Examiner—C. E. Church
Attorney—Joseph Levinson and Robert Ames Norton

[57] ABSTRACT

A radiation absorption analyzer is disclosed for the measurement of two gases in a gas sample being analyzed utilizing the same equipment, and for simultaneous measurement of the two gases with some duplication in the electronic processing. A source of infrared radiation is applied through a sample or absorption cell containing the gas to be measured, and through a rotating optical filter wheel onto an infrared detector. The filter wheel contains two analytic filters passing absorption regions of the gases desired to be measured, and two reference filters in non-absorbing regions. Two reference pickups are utilized, which generate two signals as the filter wheel rotates, which are out of phase with each other by 90°. The signals from the detector and from the reference pickups are fed to a synchronous rectifier which rejects signals 90° out of phase with the reference signal, thereby providing a rectified output representing the quantity of gas in the sample cell under test. A switch may be utilized to apply the reference signals to a single synchronous rectifier, or a separate synchronous rectifier and meter may be utilized, with the reference pickups applied one to each channel for providing simultaneous two-gas analysis.

The two-gas analyzer is provided with aperture trimming to radiometrically balance each analytic filter with respect to its reference filter. The two-gas analyzer is suitable for the measurement of auto emissions from the tail pipe of a car for use in inspection stations, garages, etc.

8 Claims, 3 Drawing Figures

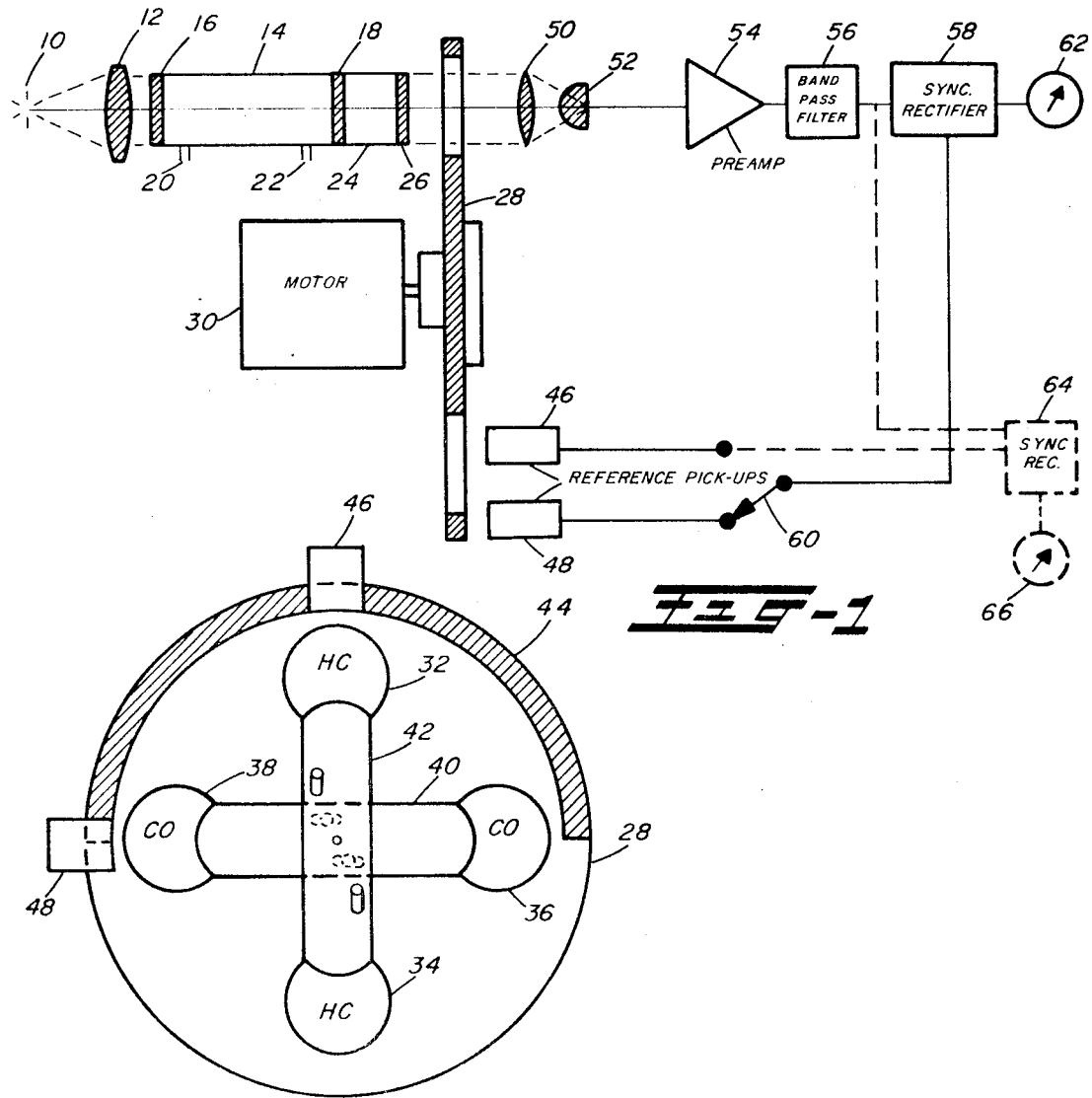

INFRARED TWO GAS ANALYZER

BACKGROUND OF THE INVENTION

This invention relates to infrared gas analysis utilizing radiation absorption phenomena, and more particularly to a gas analyzer utilizing essentially the same components for analyzing two gases in a sample, which is particularly useful for directly analyzing automotive emissions.

Many instruments have been proposed for analyzing the constituents of a gas utilizing infrared radiation. In one type, the gas sample is irradiated with radiation of a wavelength where the gas to be detected has an absorption band, thus heating up the gas whose temperature rise is measured by a suitable means, thus determining the quantity of the constituent present. Some of the proposed instruments require a two-beam system where the infrared radiation is passed in one path through a sample containing none of the gas to be analyzed, and in the other path through the sample to be analyzed. Single beam systems have been proposed using sophisticated optical techniques in order to provide relatively long absorption path lengths. Invariably most of the systems proposed are mainly suitable for laboratory type conditions which are under the supervision of highly skilled personnel and where weight and bulk are minor considerations. Even the single beam systems, which are simpler and overcome some of the aforesaid disadvantages, are still incapable of analyzing more than one gas at a time without complete duplication of equipment.

SUMMARY OF THE INVENTION

Accordingly, it is an object of this invention to provide an infrared gas analyzer which is capable of simultaneously analyzing two constituents of a gas sample without substantial duplication of equipment.

A further object of this invention is to provide an infrared two-gas analyzer which is rugged, simple, and suitable for use in unfavorable or field environments.

Another object of this invention is to provide an improved infrared gas analyzer which is suitable for use in testing automotive emissions.

Still a further object of this invention is to provide a two-gas analyzer utilizing a simple and effective radiometric calibration means.

These and other objects of the invention may be achieved in accordance with the invention in a novel infrared radiation two-gas analyzer which includes an infrared source passed through a sample cell containing the gas to be analyzed, a rotating filter wheel, and onto an infrared detector. The rotating filter wheel includes a pair of analytic filters and a pair of reference filters. Synchronous demodulator means are provided which are fed signals from the detector and from two reference pickups for selecting the detector signal to be passed to a meter for measuring the constituent of gas present in the gas sample. A single synchronous demodulator means with a switch for applying either of the two reference signals to the synchronous demodulator may be utilized or separate channels may be provided with two synchronous demodulators and the reference pickups being fed to separate synchronous demodulators. In the latter case, simultaneous two-gas analysis may be made.

BRIEF DESCRIPTION OF THE DRAWINGS

FIG. 1 is a schematic diagram of the infrared two-gas analyzer embodied in this invention.

FIG. 2 shows the rotating filter wheel utilized in the two-gas analyzer of FIG. 1.

DESCRIPTION OF THE PREFERRED EMBODIMENTS

Figure 3:
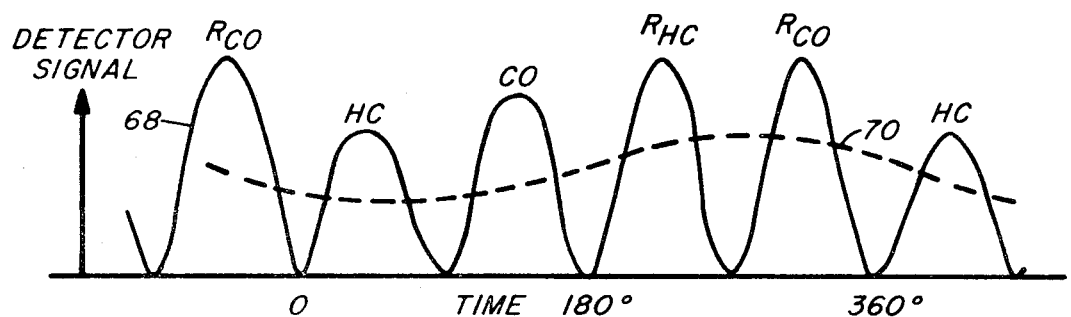
FIG. 3 shows curves of detector signal vs. time, which are useful in explaining the operation of the signal processing of the two gas analyzer embodied in this invention.

Since the two gas analyzer of the present invention is particularly suited for analyzing automotive exhaust emissions, the descriptions which follow may contain references and describe the analyzer with respect to this use for illustrative purposes, but it should be understood that the invention is not restricted to this particular field, and has application wherever a plurality of gases are desired to be analyzed using substantially the same equipment, or simultaneously.

Referring now to FIG. 1, a radiation source 10 is directed by collimating lens 12 through a sample or absorption cell 14 containing a sample of the gas to be analyzed. Any suitable source may be utilized that is characterized by having high temperature properties as well as high emissivity, for example, a Kanthal ribbon is one type of source which has been found suitable. The sample or absorption cell 14 has infrared transmitting windows 16 and 18 and a gas inlet 20 and a gas outlet 22 for flow-through sampling. After the sample cell 14, the radiation from the source 10 passes through a gas filter 24 having an infrared transmitting window 26, the function of which will be described hereinafter. The radiation then passes through a rotating filter wheel 28 driven by motor 30 onto a condensing lens 50 which applies the radiation to an infrared detector 52. The infrared detector should be capable of measuring radiation in the spectral regions where the gases which it is desired to detect have absorption bands. Thermistor bolometers have been found suitable for this application due to their ruggedness and sensitivity over wide ranges in the infrared spectrum. The output of the detector 52 is coupled to a preamplifier 54 through a band pass filter 56 to a synchronous rectifier or demodulator 58. The synchronous rectifier 58 also has an input from either reference pickup 46 or 48, depending on the position of switch 60, and the output of the synchronous demodulator 58 is applied to a meter 62 for ultimately indicating the quantity of gas constituent in the sample in the absorption cell 14. When simultaneous readings of two gases are desired, a separate channel is provided by a synchronous rectifier 64 and meter 66 with the synchronous rectifiers 58 and 64 being continuously supplied with reference signals, one from reference pickup 46 and the other from reference pickup 48.

The filter wheel 28 is shown in detail on FIG. 2. The filter wheel 28 is a four-position filter wheel having two analytic filters 32 and 36, and two reference filters 34 and 38, positioned in quadrature, thus on 90° separation of center lines. For illustrative purposes and considering the use of the invention adapted to testing of automotive exhaust emissions, analytic filter 32 may be for the testing of hydrocarbons and would be centered on the order of 3.4 microns, while analytic filter 36 could be for sensing carbon monoxide and have a bandpass centered at approximately 4.7 microns. The other two reference filters, 34 and 38, may be identical and are selected to transmit in regions where neither of the bases to be tested absorb, e.g. 4.0 microns. Analytic filter 32 and its reference filter 34, and analytic filter 36 and its reference filter 38, separated by 180°, generate a chopped reference base signal on the detector 52, which offers the advantage of providing the same proportional response due to losses in the optics such as dust or detector sensitivity changes.

The filter wheel 28 is also provided with a means for radiometrically balancing each filter with its reference so that $HC - R_{HC} = 0$ and $CO - R_{CO} = 0$ when no absorbers are present. This minimizes drift due to changes in source temperature, detector responsivity, etc., and also cross-coupling between channels caused by phasing errors of the reference pickups. The radiometric balance is achieved utilizing masks 40 and 42. The flat masks 40 and 42 have arcuate end portions concentric with the rotation axis of the wheel and which extend uniformly into the apertures of the filters on the filter wheel 28 which prevents chopping at the rotation rate of the filter. The adjustment may be made using a set screw or any other suitable means along the major axis intersecting the analytic filter and its reference filter. The adjustment obviously cannot be made while the filter wheel is rotating, but it may be accomplished close enough within two or three tries. Another way of making the adjustment would be to have the filter wheel 28 stopped and an auxiliary chopper inserted in front of the source. Subsequent fine adjustment may be made electrically.

The filter wheel 28 is also provided with reference signal generating means which generates two signals at the wheel rotation rate which are out of phase with each other by 90°. This means may be either photometric or magnetic. On FIG. 2 a photometric means is shown with the filter wheel 28 being provided with an opaque strip 44 covering half the periphery of the filter wheel, with the other half being reflective. Photo references 46 and 48 are positioned in phase quadrature, or 90° apart, along the periphery of the filter wheel 28. The reference generators 46 and 48 have a source and a photopickup for generating these signals.

One of the primary objectives of the present invention is to obtain a two gas analysis of a sample under test using a single gas source, cell, and detector. It is based on the principle that a synchronous rectifier completely rejects a signal 90° out of phase with the reference signal. As set forth above, the filter wheel 28 generates two signals at the wheel rotation rate which are out of phase with each other at 90°. One is caused by CO absorption and the other by the HC absorption. By using the two reference pickups 46 and 48, phased properly, and selecting one or the other by switch 60 as shown in FIG. 1, the rectified output from the synchronous rectifier 58 which is applied to the meter 62 will represent the quantity of CO or HC in the sample cell 14. In this form the entire electronic chain is also the same, to provide a two-gas analysis. To perform a simultaneous two-gas analysis, a separate synchronous rectifier 64 and meter 66 are provided, with reference pickup 48 being fed to the synchronous rectifier 58 for providing a CO reading on meter 62, and with the reference pickup 46 being applied to the synchronous rectifier 64 and a reading for the hydrocarbons being shown on meter 66. The output of the detector 52 is also applied from the bandpass filter 56 to the synchronous rectifier 64. Accordingly, with only the addition of a synchronous rectifier 64 and meter 66, simultaneous two gas analysis can be provided with a moderate duplication in the electronic chain.

The wave shape 68 of the detector output is shown in FIG. 3. After passing through a narrow bandpass electrical filter 56, tuned to the wheel rotation frequency $\omega$, the individual pulses from the filters at frequency $4\omega$ are completely filtered out and a sine wave 70 at frequency $\omega$ results. This sine wave 70 varies in phase and amplitude depending upon the imbalance of signals between each analytic filter and its respective reference $(HC - R_{HC})$ and $(CO - R_{CO})$. The output sine wave 70 can be expressed as the sum of the sine and cosine terms which defines the phase:

Output $= (HC - R_{HC}) \sin \omega T + (CO - R_{CO}) \cos \omega T$

The synchronous rectifier 58 in the case switch 60 is used, or 58 and 64 if simultaneous detection is utilized, selects one amplitude or the other, depending upon whether the signal reference pickup 46 or 48 is used.

With respect to the sample or absorption cell 14, if the concentrations of gases to be analyzed are the same or nearly the same, the same length cell 14 may be utilized. However, with the gases chosen for purposes of illustration here, namely hydrocarbons and carbon monoxide for automotive exhaust sampling, it is desirable to measure 0 to 10 percent carbon monoxide and 0 to 2,000 parts per million hydrocarbon. Under this set of conditions, the cell length needed for HC measurements is too long for CO when the filter matches the peak of the absorption band. The percent transmission is proportional to the absorption coefficient, the concentration of the gas, and the length of the cell. Operation on the wings of the band of CO would be a solution except that to reach a low enough absorption coefficient, it would be necessary to go so far off the band of CO that $CO_2$ or $H_2O$ interference is introduced. Since the concentrations of the gases which are to be measured are fixed and the length is set, which is adequate for the hydrocarbon, the absorption coefficient for CO must be altered. One technique which has been tested and found satisfactory is to introduce an auxiliary 2-inch long sealed cell 24, or gas filter, in the optical path, containing 50 percent CO and 50 percent nitrogen at atmospheric pressure. The function of the cell 24 is to remove the centers of the CO absorption line structure where the absorption is strongest. The radiation getting through is then primarily in the wings of the CO band between the lines, and has a lower average absorption coefficient. By this means, fairly linear response can be obtained for up to 10 percent CO with an 8-inch long sample cell.

The described invention offers the advantage of being able to analyze two gases from essentially a single channel utilizing conventional electronic processing such as that incorporated in the IT-4 radiometer manufactured by Barnes Engineering Company of Stamford, Connecticut, or with slight modification, the addition of a synchronous rectifier and another meter, the simultaneous measurement of two gases using a single beam system with a single detector. The single beam arrangement allows the single detector to be located very close to the sample cell, which allows the sample cell to be made smaller in diameter. This decreases the time required to fill the cell with gas, and thus shorten the response time of the instrument. With little dead optical space outside of the sample cell, and the close spacing of the unit, as well as chopped radiation reference based signals provided by the reference filters, no sealing is required against ambient air contamination.

Since other modifications, varied to fit particular operating requirements and environments, will be apparent to those skilled in the art, the invention is not considered limited to the examples chosen for purposes of disclosure, and covers all changes and modifications which do not constitute departure from the true spirit and scope of this invention.

I claim:
1. An infrared two gas analyzer comprising
   a. a sample cell containing a sample of the gas to be analyzed,
   b. an infrared detector,
   c. a source of infrared radiation directed through said sample cell and onto said infrared detector,
   d. a rotating filter wheel having a pair of analytic filters, each having transmissive areas which pass radiation in an absorption region of a different gas whose presence is desired to be detected, and a pair of reference filters having transmissive areas interspersed between said analytic filters for passing radiation in a non-absorbing region of said pair of analytic filters, said filter wheel being positioned between said source and said infrared detector,
   e. two reference pick-ups for generating time reference signals in accordance with the position of said filter wheel,
   f. synchronous demodulator means coupled to said infrared detector and said reference pick-ups for rectifying and selecting the signal for the gas desired to be detected; and
   g. means for indicating the amount of the gas which is detected.

2. The two-gas analyzers set forth in claim 1 wherein said two reference pick-ups are positioned in quadrature around said filter wheel.

3. The infrared two-gas analyzer set forth in claim 1 including compensation means for radiometrically balancing said analytic filter with its reference filter to provide no signal when no absorber gases are present.

4. The infrared two-gas analyzer set forth in claim 3 wherein said compensation means includes a masking means comprising an adjustable mask for trimming the transmissive areas of said filters.

5. The infrared two-gas analyzer set forth in claim 4 wherein said adjustable mask has arcuate end portions which project uniformly in the transmissive of said filters to prevent radiation chopping by said mask.

6. The infrared two-gas analyzer set forth in claim 1 in which said synchronous demodulator means comprises two synchronous demodulators, one for each gas with the output of the detector being coupled to each synchronous demodulator and the output from each of said reference pick-ups being applied to a different synchronous demodulator and separate meter means coupled to each synchronous demodulator for providing a simultaneous reading for the two gases being analyzed.

7. The two-gas analyzer set forth in claim 6 wherein said filters on said filter wheel and the reference pick-ups around said filter wheel are positioned in phase quadrature, and masking means are provided to trim the transmissive areas of said filters for providing a radiometric balance between the analytic and the reference filters.

8. The two-gas analyzer set forth in claim 1 wherein one said analytic filter passes radiation in a hydrocarbon absorption region on the order of 3.4 microns and the other analytic filter passes radiation in a carbon monoxide region on the order of 4.7 microns and said reference filters are clear for both these gases.

* * * * *